United States Patent
Jam et al.

(10) Patent No.: US 7,103,230 B1
(45) Date of Patent: Sep. 5, 2006

(54) EMBEDDING EDITING COMMANDS IN DIGITAL IMAGES

(75) Inventors: Mehrban Jam, Fremont, CA (US); Bo Shen, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 725 days.

(21) Appl. No.: 10/298,079

(22) Filed: Nov. 15, 2002

(51) Int. Cl.
   *G06K 9/36* (2006.01)
(52) U.S. Cl. .................. 382/276; 382/232; 358/452
(58) Field of Classification Search ............... 382/232, 382/311, 325, 276; 358/452; 386/55
   See application file for complete search history.

(56) References Cited

U.S. PATENT DOCUMENTS 6,940,518 B1 * 9/2005 Minner et al. ............ 345/557
2001/0041022 A1 * 11/2001 Edwards et al. ........... 382/309
2002/0140829 A1 * 10/2002 Colavin et al. .......... 348/231.99

* cited by examiner

*Primary Examiner*—Jingge Wu
*Assistant Examiner*—Yubin Hung (57) ABSTRACT

When editing a digital image that has previously been saved in a lossy manner (whether such losses result from the editing operations and/or from inherently lossy image file formats such as JPEG), each additional editing session typically compounds the overall losses. As an alternative, we disclose creating and storing a proxy for an edited image, the proxy including a baseline image and a series of meta data representing editing operations performed on that image. During a subsequent editing session, the edited image can be partially or wholly reconstructed by applying the meta data to the baseline image, resulting in a comparatively lossless version thereof. The reconstructed image can be used as a starting point for additional edits, thereby minimizing the compound losses that would otherwise have resulted.

32 Claims, 4 Drawing Sheets

FIG. 1

<USER COMMENT FIELD>

1, 1, cropping, +5, -2, -1, +3, 4/29/02/11:32:03. J. Doe 2, 0, auto_balance, -, 4/29/02/11:32:03. J. Doe 3, 0, red_eye_reduction, -, 4/29/02/11:32:03. J. Doe 4, 0, sizing, 640x480, 4/29/02/11:32:03. J. Doe 5, 0, subtitling, current time, 4/29/02/11:32:03. J. Doe 6, 0, contrast_adjustment, +5, 4/29/02/11:32:03. J. Doe 7, 1, compression, 0.75, 4/29/02/11:32:03. J. Doe <BASELINE IMAGE IN SELECTED FILE FORMAT>

(sample binary representation follows)

qweijf woepif woeijf wwpeofpi9qw3ur2x95mrt90qx4-9ru m3gouvena;o8ryq90238r2xr7y29xyr ......

EMBEDDING EDITING COMMANDS IN DIGITAL IMAGES

BACKGROUND

Digital images are often too large to conveniently handle and transmit from one party to another. For example, a moderate resolution image such as a 16-bit color image acquired using a 1024×768 pixel resolution occupies 4.5 MB. Over a 56 Kbits/sec modem connection, such an image would take 11 minutes to download. Therefore, images are commonly compressed in accordance with, and stored in the form specified by, standard compression protocols. Some protocols in common use, for example, those resulting in the GIF and some types of TIFF file formats, are lossless. In those formats, the compressed image does not lose any information compared to the original image. However, for many applications the degree of compression offered by lossless compression is not enough. In such cases, a higher degree of compression can be obtained by using lossy compression, which discards some information in the original picture in order to achieve greater compression. Thus, the most commonly used format (JPEG) is lossy. Other examples of lossy formats include JFIF and MPEG (for video).

We will illustrate the occurrence of lossiness using JPEG, which is perhaps the best known and most commonly used file compression standard. JPEG involves 5 basic steps: (1) parsing an image into macroblocks; (2) transforming the image into the frequency domain using a discrete cosine transform (DCT); (3) quantizing the DCT coefficients; (4) run-length encoding the quantized DCT coefficients; and (5) variable-length encoding the result.

In step (1), the image (a matrix of pixel values) is decomposed into 8×8 blocks known as macroblocks.

In step (2), each macroblock is operated on by a DCT module to yield an equivalent 8×8 block of frequency domain coefficients. DCT is simply the counterpart, in the digital domain, to the fourier transform in the analog domain.

In step (3), the coefficients of each macroblock are quantized in a process that typically involves division by an integer and rounding off. For example, if the divisor is 10, values 1049, 1000 and 951 would divide to 104.9, 100.0 and 95.1, which might (depending on the desired degree of rounding) all round to 100. It is this quantizing step that leads to the lossy nature of JPEG.

In step (4), the quantized values are further (but losslessly) compressed using run-length encoding (RLE). RLE is a technique for reducing redundancy in a string of information. For example, in a conceptual illustration, a string such as 77777777222222 might be represented as the shorter string 7(8)2(6), where each parenthetical value in parenthesis represents the number of repetitions of the preceding value.

In step (5), the RLE string is further (losslessly) compressed by a process called variable-length encoding (VLE). In VLE, the relative frequencies of occurrence of each element in the string to be encoded are determined, and more frequently occurring strings are encoded using shorter codes. For example, in a conceptual illustration, in a string where 7(8) occurred most frequently and 2(6) occured the least frequently, 7(8) might be represented using a single digit code, while 2(6) might be represented using multiple digits.

Finally, the VLE string is written to storage.

The foregoing assumes that the image consists of one value per pixel. This may be true for monochromatic or grayscale images but, in general, images will be comprised of three color values per pixel location. For example, the image might be in a red-green-blue (R,G,B) color space, or in a luminance +2 chrominance (Y,Cb,Cr) color space. For color images steps (1)–(5) are typically performed on each color component separately. As a matter of convenience, we will refer to images without differentiating whether such images are grayscale or color, with the associated processing being understood to apply to each color component thereof in the case of color images.

In order to use a compressed image, the encoded image is first retrieved, then decoded using the mathematical inverse of the encoding protocol. For example, in JPEG, the DCT coefficients are recovered, then converted back to the spatial domain using an inverse discrete cosine transform (IDCT). Once converted back to the spatial domain, the image can be displayed and/or manipulated using well-known and widely commercially available image editing software such as Adobe Photoshop, as well as many others.

As illustrated above, each time an image is encoded and stored using a lossy compression protocol, some information is irreversibly lost. Thus, when a lossy encoded image is decoded, the image becomes visually degraded to some degree. Depending on the degree of loss, this degradation may or may not be apparent to the viewer.

However, the effect of several such individual degradations can become cumulative, depending on how the image is used. For example, suppose that a user acquires an image using a digital camera which encodes it using JPEG on a memory card. At this stage, the degradation might only be minimal. Later, the user downloads the image from the memory card onto his computer, and loads (decodes) it for viewing. At that point, the user decides to edit the image (for example, by cropping), then prints it and stores (reencodes) it onto his hard disk. The reencoding process introduces a further degradation relative to the original image seen at the digital camera's sensor. Upon printing, the user sees that one of the people in the picture suffers from red-eye (or green-eye in case of animals), so he loads (decodes) the image, uses his software to fix the problem, and stores (reencodes) it. The reencoding will again introduce further degradation.

As shown by this simple example, even a relatively common sequence of simple edits can result in substantial degradation if the image is reencoded between successive edits.

To use a crude analogy, the original image can be viewed as a sheet of paper, which is compressed (encoded) by crumpling the sheet into a ball. Each time the paper is smoothed out (decoded—say for editing) and then recrumpled (reencoded), the degradation becomes worse.

Of course, users can take steps to reduce such cumulative degradation. For example, it is often recommended to avoid saving (encoding) an image until all edits are finished, or to save intermediate versions using lossless formats such as TIFF or GIF. However, these techniques are often inconvenient, for example, when all editing cannot be performed in a single session, or cannot be anticipated. Also, sometimes images are to be edited by multiple persons at different times and different locations, where bandwidth constraints on transmission discourage the use of lossless file formats for intermediate versions.

SUMMARY

Various exemplary techniques are presented for editing a digital image, creating a proxy for said edited image, and/or using the proxy to partially or wholly reconstruct and/or edit the digital image.

In an exemplary embodiment for creating the proxy, an image editing program: (a) obtains a digital image to be edited; (b) edits the digital image; and (c) creates a proxy for the edited digital image including (i) a baseline version of the original digital image, and (ii) references to meta data representing at least some of the editing operations. The meta data is usable during a subsequent session to reconstruct the edited digital image from said baseline version of said digital image, where the reconstructed image does not include the losses that would have resulted from storing the edited digital image in a conventional manner. Thus, it becomes possible (among other things) to store images in a lossy file format, yet re-access and/or edit such images without aggregating the losses across multiple sessions.

Other exemplary alternative embodiments and aspects are also disclosed.

DETAILED DESCRIPTION

I. Image Editing Technologies

A wide variety of photo editing, presentation, layout, web development, and other programs are currently available which allow users to edit (e.g., create, manipulate, and/or otherwise process) images. The images editable by such programs may include photos, graphics, drawings, animations, and still other forms currently known or otherwise developed in the future. For example, some commonly available programs usable to edit such images include Adobe Photo Deluxe, Adobe Photoshop, Corel Photo-Paint, Jasc Paint Shop Pro, Macromedia Fireworks, Microsoft Picture It, and Microsoft Powerpoint, just to name a few.

Such programs provide a wide variety of editing techniques (and associated tools), ranging from the very simple to the very sophisticated. Generally, these techniques may be regarded as falling into the following (somewhat arbitrary) categories: (a) resolution; (b) layout; (c) coloring; (d) stylus; (e) artistic; (f) security; and (g) animations. The following lists some common examples of the wide variety of editing techniques in the above categories, in connection with which the technologies disclosed in this patent can be used:

(a) resolution-related techniques/tools might include
  (i) setting compression levels,
  (ii) dithering (e.g., where pixels of two colors are used in a chessboard pattern to give the appearance of a third),
  (iii) sharpening/smoothing,
  (iv) configuring for progressive display (e.g., "progressive JPEG" which initially loads a low resolution image which then gets sharper, as opposed to scrolling in an image piece by piece), and
  (v) file format conversion;
(b) layout techniques/tools might include
  (i) resizing/zooming/cropping,
  (ii) cutting and pasting/slicing/composition,
  (iii) rotation,
  (iv) shearing,
  (v) alignment (e.g., lining up elements, correcting crooked seams, etc.), and
  (vi) changing/correcting perspective;
(c) stylus techniques/tools might include
  (i) adjusting brightness,
  (ii) adjusting contrast,
  (iii) adjusting color balance/tone/tint/hue,
  (iv) adjusting dynamic range/saturation,
  (v) adjusting lighting effects,
  (vi) removing reflections/red eye, and
  (vii) optical filter analogs (e.g., skylight, haze, neutral density, sepia, etc.);
(d) coloring techniques/tools might include
  (i) drawing tools (e.g., pencil, pen, eraser),
  (ii) text tools,
  (iii) paintbrushes/markers (for coloring, texturing/patterning, etc.),
  (iv) masking tools,
  (v) airbrushing/retouching tools, and
  (vi) special tools to remove artifacts (e.g., dust, scratches, blemishes, wrinkles);
(e) artistic techniques/tools might include
  (i) special effects filters (e.g., engraving, embossing, scratches, ripples, canvas effects, oil painting finishes, glassy finishes, etc.),
  (ii) templates (e.g., borders, backgrounds, under/overlays, etc.), and
  (iii) tiling tools;
(f) security techniques/tools might include
  (i) watermarking, and
  (ii) other anti-copying techniques; and
(g) animation techniques/tools might include:
  (i) rollovers (e.g., as user rolls mouse over an image, it is replaced by another),
  (ii) fly-ins,
  (iii) pop-ups, and
  (iv) fade ins/outs.

During image editing, a user will often change his mind after applying one or more editing techniques. For example, the user might increase the brightness, then decide the darker view was better. Therefore, many image editing programs allow the user to "undo" one or more prior edits. Were this not the case, those edits which cause a loss of information, for example, zooming in on a portion of an image to the exclusion of the other portions, would be permanent once made. However, the user can only undo edits made during the current session, but not from earlier sessions. That is, once an edited image is saved, and the image editing program closed, the ability to "undo" former edits is lost. In addition, additional losses may occur if the image is saved to a lossy image format, for example, JPEG. Indeed, even where the edits are per se lossless (e.g., a simple left-right flip, or other form of rotation), the mere act of saving the edited image (e.g., to guard against system crashes, to continue editing at a later time, etc.) can also cause loss of information because of the compression that occurs upon saving.

Unacceptable degradation of an image can therefore result from one or more lossy editing operations, one or more savings of an image to a lossy format, or a combination of the foregoing.

II. An Exemplary Editing and Writing Operation

Figure 1:
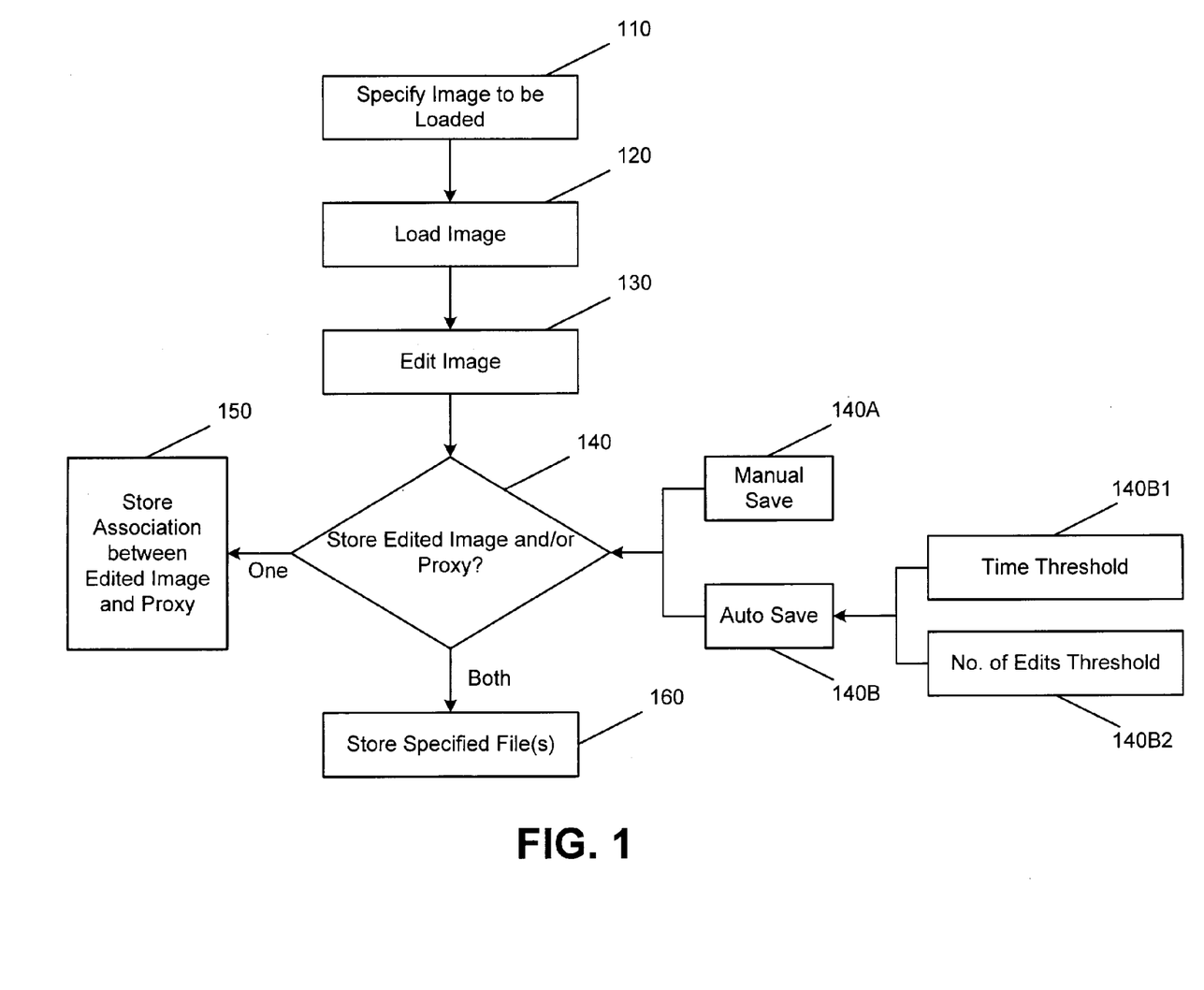
FIG. 1 illustrates an exemplary process for writing a digital image file with meta data editing commands.

Referring now to FIG. 1, we describe an exemplary process for eliminating or reducing such losses by embedding editing commands (or operations) in a digital image.

At step 110, the user specifies an image to be loaded.

At step 120, the editing program (which could be a newly created program, or a currently available program suitably modified to accommodate the techniques of this patent) loads the image.

At step 130, the user performs one or more edits on the image, which is displayed on the screen for the user to view.

At step 140, the image editing program searches for an instruction to (i) store either the edited image or a proxy therefore (described below), or (ii) store both the edited digital image (which will be comparatively lossy) and a proxy (which will be comparatively lossless). This determination could be made by querying preset defaults, and/or based on user input, depending on program configuration.

The instruction (if any) to save the proxy could occur in response to the user issuing a save command (step 140A), or by a built-in auto-save feature (step 140B). If the latter, the save command could be triggered by the passage of time (step 140B1), or upon reaching a threshold number of edits (step 140B2). If the proxy is saved (whether performed manually or automatically), this can be regarded as a form of checkpointing—creating one or more reference states, each of which can be restored either using another image editing program, or using the same image editing program at a later point in time.

In an exemplary embodiment, a proxy comprises a baseline (e.g., substantially lossless) version of the image, plus meta data representing at least the lossy edits which have been performed. As mentioned above, such lossy edits could include losses inherent to the editing operation, or prospective losses that would have been introduced upon saving the image (in the normal fashion) using a lossy image compression protocol. A "baseline" image (or version) includes, without limitation, at least one file equal to, or otherwise comparable or equivalent in an informational sense, the original digital image (e.g., image prior to editing performed in the current session) that is stored in its original or raw format, JPEG format, GIF format, TIFF format, PNG format, and/or other digital formats.

In this exemplary embodiment, the edits are recorded as meta data in accordance with a predetermined format. Such format may be unique to the particular image editing program being used, or may belong to a universal standard recognized by various image editing programs. If the latter, an edited image stored in proxy form can be program-independent. In the exemplary case of JPEG images, the command meta data could be written in one or more user data fields. In the exemplary case of EXIF images, the command meta data could be written in one or more user comment fields. For convenience, we shall refer to all such fields as user comment fields. Exemplary meta data will be illustrated below with respect to FIG. 2.

At step 150, the program optionally stores an association between the edited digital image, and its corresponding proxy. In one embodiment, this association is maintained by writing the name of the proxy into a field of the edited digital image. This field could be internal (e.g., embedded within the file) or external (e.g., as part of the filename, in a separate image-proxy index file such as a lookup table, etc.).

At step 160, the program stores one or both entities (edited file and/or proxy), as specified.

If the proxy is stored, it can be later used to reconstruct the edited digital image, by re-applying the editing commands (represented by the meta data) to the original (or baseline or reference) image. This reconstructed image could be used when a user wishes to make one or more additional edits to the edited digital image. Such additional edits could even include undoing a previous edit, making the proxy useful as a form of "recovery file." Use of the proxy will be explained in more detail with respect to FIG. 3 below.

The image input and output operations specified herein could be performed using a GUI, scroll down menu, or other form of user interface.

III. An Exemplary Proxy File

Figure 2:
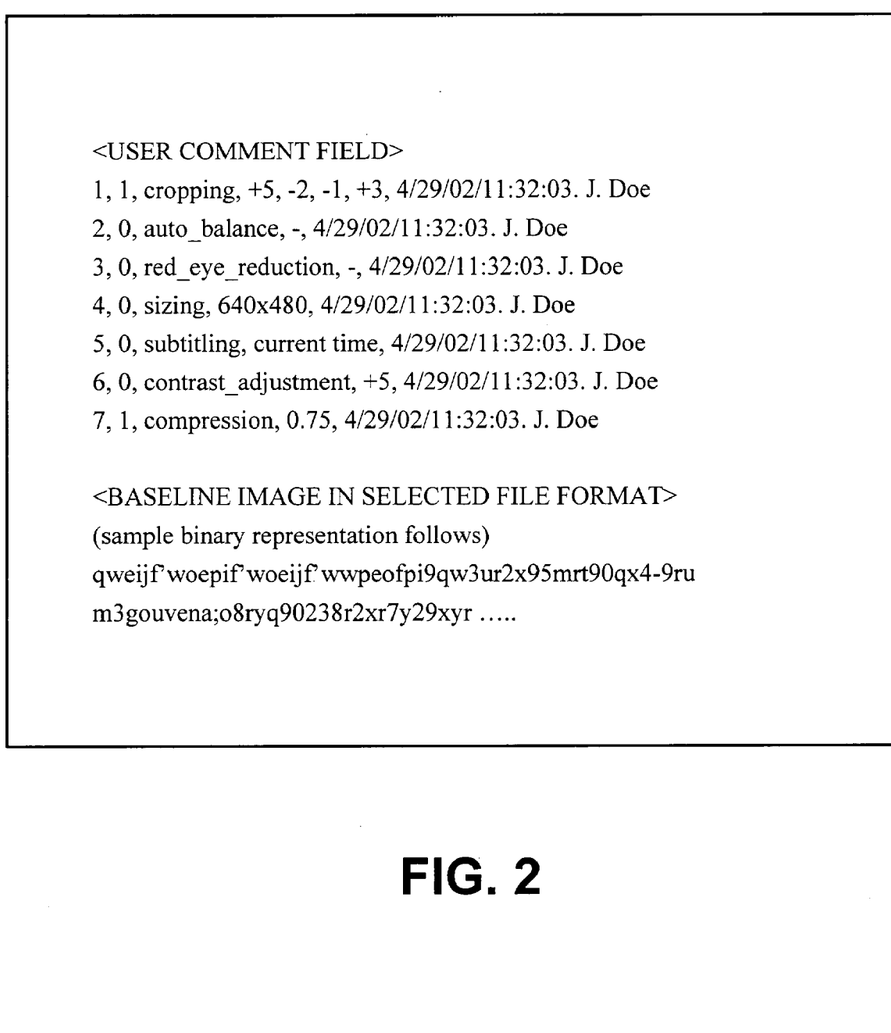
FIG. 2 illustrates an exemplary digital image file containing meta data editing commands.

FIG. 2 illustrates an exemplary proxy file containing the meta data editing commands written using the technique described in Section I. In this exemplary implementation, the meta data for each editing command follow the following format:

[order, marker bit, function name, function parameters, time, author]

The first element, order, specifies the executing order of the associated command. The second element, marker bit, specifies whether the command is modifiable. The third element, function name, specifies the editing command used by the image editing program. The fourth element, function parameters, specifies the parameters (if any) input to the editing command. The fifth element, time, specifies the time the editing command was recorded. The sixth element, author, specifies the name of the author.

For example, suppose that the image is a photograph of a person, and that the user performs the following operations: (1) invokes the program's automatic color balance feature; (2) invokes the program's automatic red eye reduction feature; (3) resizes the image resolution to 640×480; (4) adds a subtitle consisting of the current time; (5) increments the contrast by +5 units; (6) crops the image by moving the left edge 5 units to the right, the right edge 2 units to the left, the top 1 unit down, and the bottom 3 units up; and (7) compresses the image by a factor of 0.75. Suppose further that, in this exemplary implementation, the image editing program accumulates the ongoing editing operations in a RAM, and records all the commands to disk (or other computer-readable media) at the same time, say at 11:32:03 on Nov. 5, 2002. Such recordation could occur, for example, in response to a periodic auto-save feature. Finally, suppose that the author's name is John Doe.

Then, the associated string of editing commands saved into the user comment field of the image might be as follows:

1, 0, auto_balance, -, 4/29/02/11:32:03. J. Doe
2, 0, red_eye_reduction, -, 4/29/02/11:32:03. J. Doe
3, 0, sizing, 640×480, 4/29/02/11:32:03. J. Doe
4, 0, subtitling, current time, 4/29/02/11:32:03. J. Doe
5, 0, contrast_adjustment, +5, 4/29/02/11:32:03. J. Doe
6, 1, cropping, +5, −2, −1, +3, 4/29/02/11:32:03. J. Doe
7, 1, compression, 0.75, 4/29/02/11:32:03. J. Doe The presence of a "1" for the marker bit (here, the second element) indicates (in this exemplary embodiment) that the cropping operation must occur in its execution order as listed (e.g., first), and the compression operation must occur in its execution order as listed (e.g., last). All other instances of the marker bit, being "0," indicate that the order of these operations is immaterial. That is, they can be performed in any arbitrary order, and the overall result will not materially change. Specification of the marker bit (i.e., ordering requirement or flexibility) can be performed by the user (e.g., by an option at the time of issuing a editing command), or by the image editing program in accordance with a preprogrammed logic.

Of course, the use of a marker bit is entirely optional. The same is true of the elements denoting order, time, and author. For example, a minimal format could be implemented using only the following elements: function name and function parameters.

All of the foregoing is merely exemplary, and those skilled in the art will recognize that virtually any combination of elements for the editing commands could be selected and used. The particular choice for any given application will depend on the family of editing commands available to that program, and whether the commands are recorded in a universal format shared among many programs, or are manufacturer- or program-specific.

Furthermore, the commands need not even be embedded directly in the proxy file. For example, in one convention, some or all of the commands could be indirectly embedded by placing such commands in a separate file whose name is embedded in a field of the proxy file. Or, in another convention, the name of the separate file could be recited as part of the proxy file name according to a predetermined format recognizable by the image editing program. Of Course, the use of separate files for editing comments is less robust than direct embedding, because the linkage between the proxy file and the separate file is more likely to become inadvertently broken. All of these and still other variations will be readily apparent to those skilled in the art in light of the general technique disclosed herein.

IV. An Exemplary Reading and Additional Editing Operation

Figure 3:
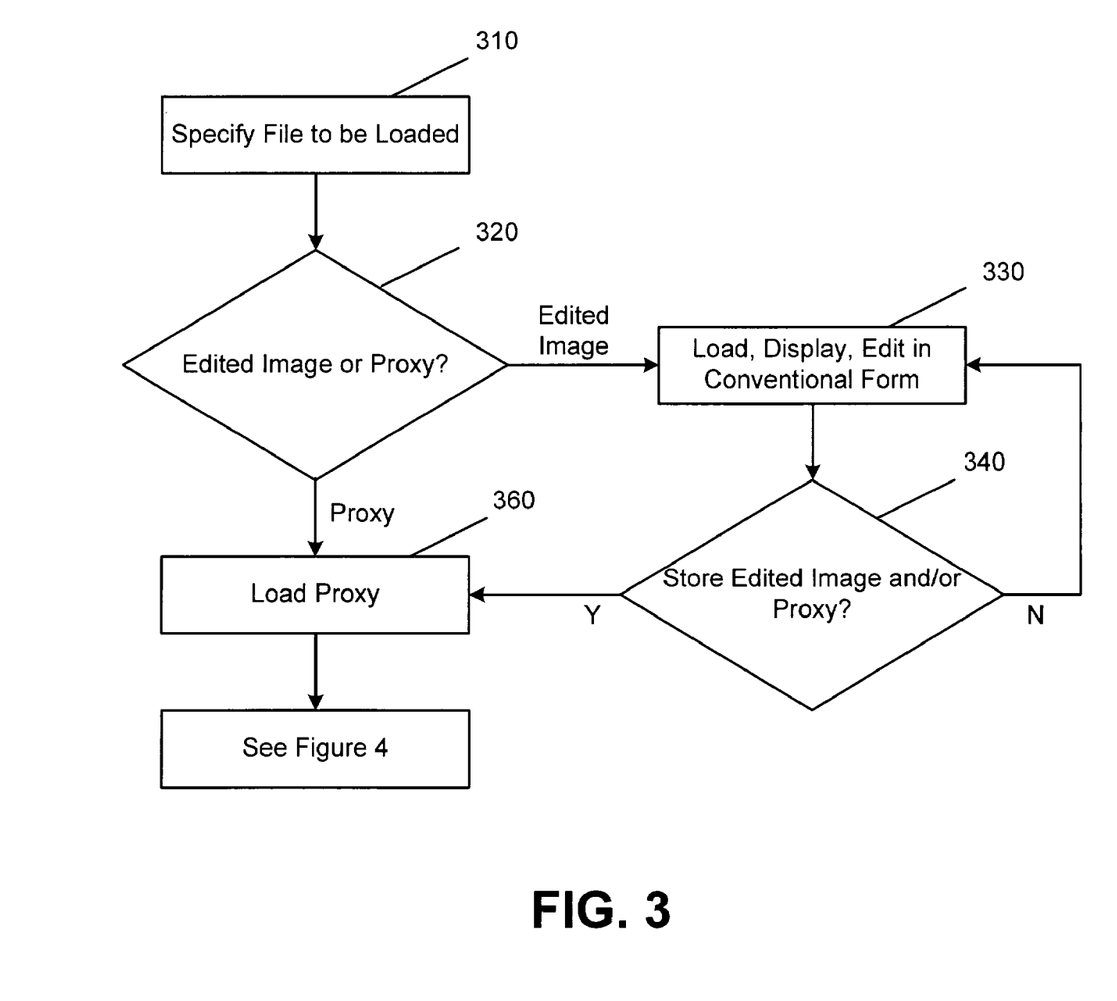
FIG. 3 illustrates an exemplary process for loading a digital image file that may contain meta data editing commands.

FIG. 3 illustrates an exemplary process for reading a digital image file that may contain meta data editing commands.

At step 310, the user specifies a file to be loaded. This file could either be a normal digital image (e.g., one lacking meta data for editing commands), or a proxy for an edited digital image (e.g., one including meta data for editing commands).

At step 320, the image editing program determines whether the file is an edited digital image rather than a proxy, by searching for at least part of the meta data.

At step 330, if the file is a normal digital image rather than a proxy, the editing program loads, displays and allows additional edits on the image in the usual fashion.

At step 340, the editing program determines whether a corresponding proxy also exists (by searching for the association data referred to in step 150 above).

At step 350, if no proxy exists, the editing program continues in the conventional fashion, allowing the user view and/or edit the image.

At step 360, if a proxy exists, it may be loaded in preparation for allowing the user to perform additional editing (including reversing prior operations) operations on the image, as opposed to merely viewing it. The editing program may be configured to automatically load the proxy, in preparation for future possible use, or the program may only load the proxy when the user specifies an editing command (or otherwise indicates an intention to perform edits).

At this stage, the program may also reconstruct the image by performing some or all of the editing operations indicated by the meta data, or even additional editing operations. This will be described in greater detail below, with respect to FIG. 4.

Figure 4:
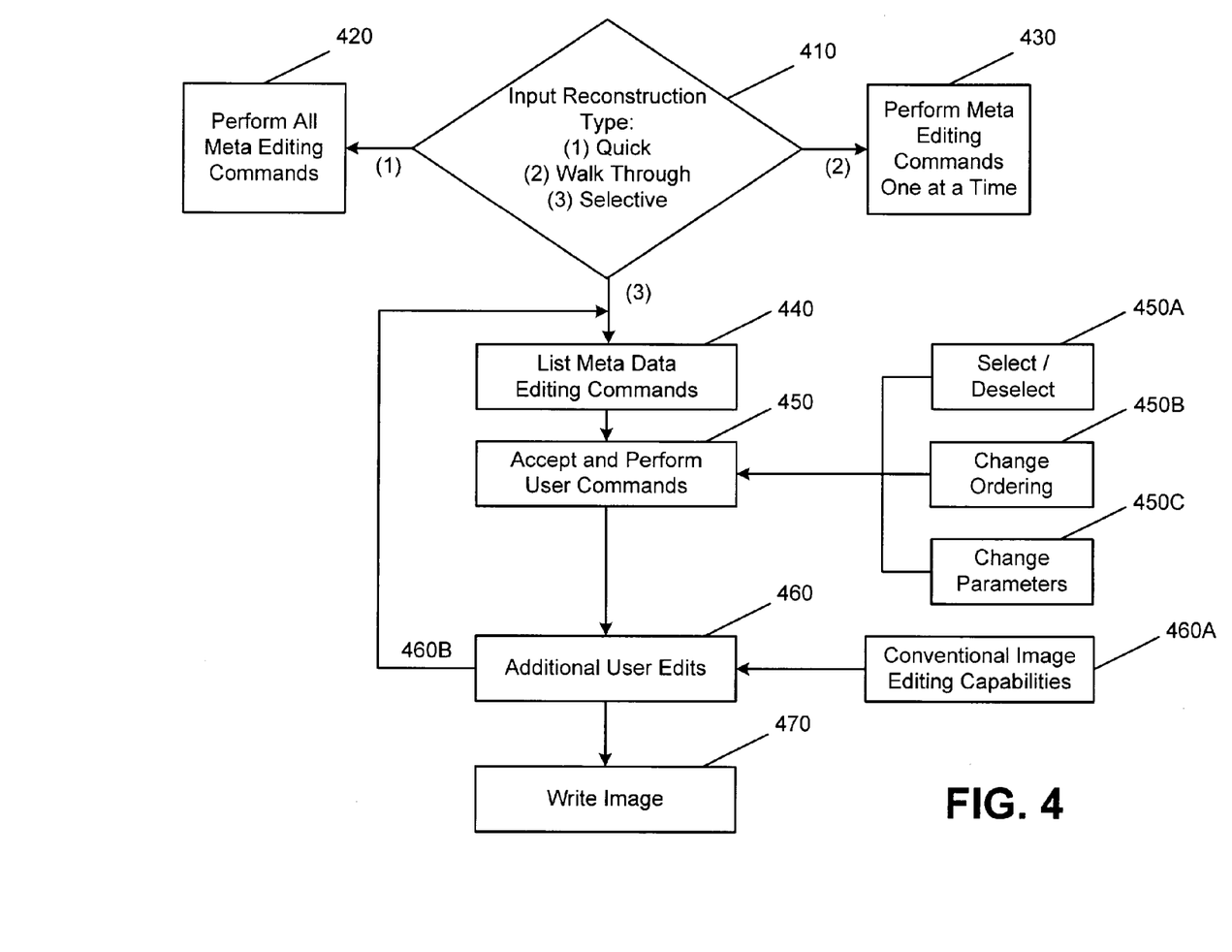
FIG. 4 illustrates an exemplary process for reconstructing and optionally editing a digital image file using meta data editing commands.

FIG. 4 illustrates various exemplary processes for reconstruction, and additional editing, of the image represented by the proxy. Some or all of these could be actually performed in any given implementation, depending on design choice. For example, the program could operate in: (i) "quick" mode; (ii) "walk through" mode; and/or (iii) "selective reconstruction" mode. In practice, the user may be presented with some or all of these (or other) choices (or even no choice at all). For convenience, FIG. 4 illustrates a program configuration in which the user has access to three possibilities.

At step 410, the program receives the user's choice of reconstruction type: (i) quick; (ii) walk through; or (iii) selective. This may depend, for example, on whether the user wishes to review and revise prior operations, or to simply pick up where he left off in a prior session.

At step 420, in a quick reconstruction mode, the program automatically performs all the editing commands represented by the meta data, so as to quickly and fully reconstruct the image.

At step 430, in a walk through mode, the program could simply perform the edits one at a time, pausing to allow the user to see the result of each operation before continuing to the next operation. This mode might be useful when the user simply wishes to review prior edits (e.g., to see what has previously been done) before continuing with additional edits.

At step 440, in a selective reconstruction mode, the program could present the user with a menu or listing of the edits to be performed.

At step 450, the program accepts user command related to the meta commands. For example, at step 450A, the user could select/deselect one or more edits. Or at step 450B, the user could change the ordering (subject to the marker bit restrictions, if any, described earlier with respect to FIG. 2). Or, at step 450C, the user could change the editing parameters for any given command, etc. The program then performs the edits as specified or modified.

At step 460, the user can make any additional edits desired, either through the conventional editing capabilities of the program (460A), and/or going back through the selective reconstruction mode (460B), depending on the extent to which the user wishes to be guided by the prior editing framework.

At step 470, after the user has revised the picture to his satisfaction (including possibly by doing nothing), the image can be written to any form of computer-readable medium. As in steps 130–150 of FIG. 1, the image can be saved in any desired form. For example, if the user believes no more edits (or reviews) will be performed, he can direct the program to save the image in the conventional manner (i.e., without meta data) only. Or, if the user knows he will later continue to edit (or review) his work, he can direct the program to save the image in proxy form (i.e., baseline image plus meta data) only. Or, the program could store both.

If the image is saved as proxy form, the baseline could be the same baseline as from a prior editing session, with the meta data for the additional edits being added to prior meta for prior edits. Or, the baseline could be a prior edited digital image (from steps 320 and 330), with the meta data for the additional edits being expressed relative to the prior edited digital image.

The image input and output operations specified herein could be performed using a GUI, scroll down menu, or other form of user interface.

VII. Conclusion

The foregoing examples illustrate certain exemplary embodiments from which other embodiments, variations, and modifications will be apparent to those skilled in the art. Therefore, references to terms such as "e.g.," "example," "such as," "including" and the like should not be construed as words of limitation.

Additionally, many of the exemplary processes described in FIGS. 1, 3 and 4 constitute a collection of sub-processes. Those skilled in the art will recognize that some or all of such sub-processes (or still other variants thereof) could be deployed in a particular system, depending on the desired implementation. This may reflect a particular edition/price point for the program (e.g., home v. professional edition), or it may reflect the user's having made a default selection upon installing or initializing the editing program, or it may reflect the user's making a choice (e.g., to override a default) in real time.

Finally, although the foregoing has been disclosed with respect to still image, the techniques disclosed herein could also be used in connection with other forms of digital images or files, such as video and/or audio.

Therefore, the inventions should not be limited to any of the particular embodiments discussed above, but rather are defined by the claims.

What is claimed is:

1. A method for editing a digital image, and writing said edited image to a computer-readable medium, comprising:
   (a) obtaining a digital image to be edited;
   (b) editing said digital image by using a computer-implemented image manipulation program to perform a plurality of operations thereon;
   (c) writing, to a computer-readable medium, a proxy for said edited digital image including:
     (i) a baseline version of said digital image obtained in (a), and
     (ii) meta data representing at least some of said performed operations,
       (A) said meta data being usable by a subsequent viewer to reconstruct said edited digital image from said baseline version of said digital image; and
   (d) storing a reference to said proxy in said edited digital image.

2. The method of claim 1 where said baseline version of said digital image is said digital image obtained in (a).

3. The method of claim 1 further comprising writing said edited digital image to a computer-readable medium.

4. The method of claim 3 further comprising writing an identifier of said proxy in a field of said written, edited digital image.

5. The method of claim 1 further comprising:
   (d) loading said proxy for said edited digital image; and
   (e) using at least some of said meta data in said proxy to obtain a reconstructed digital image from said baseline version of said digital image.

6. The method of claim 5 further comprising:
   (f) receiving a user instruction to perform additional editing of said reconstructed digital image; and
   (g) performing said additional editing on said reconstructed digital image.

7. The method of claim 1 where:
   (i) said performed operations include lossless and lossy operations;
   (ii) said baseline version of said digital image includes the result of having performed at least some of said lossless operations; and
   (ii) said stored meta data represents at least some of said lossy operations.

8. The method of claim 1 where said (c) is performed as part of a checkpointing procedure.

9. The method of claim 1 where:
   (i) said written proxy is compatible with a JPEG format; and
   (ii) said meta data are written in a user comment field of said proxy.

10. The method of claim 1 where at least one field of said proxy includes a name of an external file containing said meta data, said field thereby indirectly referencing said meta data.

11. A computer-readable medium containing computer-executable instructions for creating a lossless version of a digital file that would ordinarily be stored in lossy form, said instructions that when executed:
   (a) obtain a digital file;
   (b) perform computerized editing of said digital file to obtain an edited digital file;
   (c) create a proxy file by appending, to said digital file, references to a plurality of editing instructions capable of being executed to restore said edited digital file to a pre-saved state of said edited digital file;
   (d) write said proxy file to a computer-readable medium; and
   (e) include a reference to said proxy in said edited digital file.

12. The computer-readable medium of claim 11 further comprising instructions for:
   (d) loading said proxy file; and
   (e) performing at least some of said editing instructions from said proxy file on said digital file to obtain a reconstructed digital file.

13. The computer-readable medium of claim 12 further comprising instructions for:
   (f) receiving a user instruction to perform additional editing of said reconstructed digital file; and
   (g) performing said additional editing on said reconstructed digital file.

14. The computer-readable medium of claim 11 further comprising instructions for performing said (c) as part of a checkpointing procedure.

15. A device for creating a lossless version of a digital file that would ordinarily be stored in lossy form, said device comprising:
   (a) an input interface for obtaining a digital file;
   (b) means for performing computerized editing of said digital file to obtain an edited digital file;
   (c) means for creating a proxy file by appending, to said digital file, references to a plurality of editing instructions capable of being executed to restore said edited digital file to a pre-saved state of said edited digital file;
   (d) an output interface for writing said proxy file to a computer-readable medium; and
   (e) means for including a reference to said proxy file in said edited digital file.

16. The device of claim 15 further comprising:
(d) means for loading said proxy file;
(e) means for performing at least some of said editing instructions from said proxy file on said digital file to obtain a reconstructed digital file;
(f) means for receiving a user instruction to perform additional editing of said reconstructed digital file; and
(g) means for performing said additional editing on said reconstructed digital file.

17. A method for recreating a digital image, using a predecessor thereof, together with meta data editing commands therefor, comprising:
(a) obtaining a proxy for a digital image using a reference to said proxy included in said digital image;
(b) extracting from said proxy:
   (i) a baseline image; and
   (ii) meta data representing edits to be performed thereon;
(c) at least partially reconstructing said digital image by using a computer-implemented image manipulation program to perform at least some of said edits specified by said meta-data on said baseline image; and
(d) writing, to a computer-readable medium, said reconstructed digital image resulting from (c).

18. A computer-readable medium containing computer-executable instructions for recreating a digital image, using a predecessor thereof, together with meta data editing commands therefor, said instructions that when executed:
(a) obtaining a proxy for a digital image using a reference to said proxy included in said digital image;
(b) extracting from said proxy:
   (i) a baseline image; and
   (ii) meta data representing edits to be performed thereon;
(c) at least partially reconstructing said digital image by performing at least some of said edits specified by said meta-data on said baseline image; and
(d) writing, to a computer-readable medium, said reconstructed digital image resulting from (c).

19. A device for recreating a digital image, using a predecessor thereof, together with meta data editing commands therefor, comprising:
(a) an input interface for obtaining a proxy for a digital image using a reference to said proxy included in said digital image;
(b) means for extracting from said proxy:
   (i) a baseline image; and
   (ii) meta data representing edits to be performed thereon;
(c) means for at least partially reconstructing said digital image by performing at least some of said edits specified by said meta-data on said baseline image; and
(d) an output interface for writing said reconstructed digital image resulting from (c), to a computer-readable medium.

20. A method of minimizing losses from performing successive editing of a digital image, comprising:
(a) loading a digital image to be edited, said loaded image:
   (i) having been stored in a lossy manner; and
   (ii) containing a reference to a proxy for itself, said proxy including:
      (A) a baseline image, and
      (B) meta data representing operations which, if performed on said baseline image, will reproduce said image to be edited absent said storage losses in (i);
(b) obtaining said referenced proxy;
(c) reproducing a version of said image to be edited, by operating on said baseline image using said meta data;
(d) performing an additional operation on said lossless image as reproduced in (c), rather than on said lossy image as loaded in (a);
thereby preventing said lossiness from said prior storage from accumulating into a subsequent lossy storage of said edited image.

21. A computer-readable medium containing computer-executable instructions for minimizing losses when performing successive editing of a digital image, said instructions that when executed:
(a) loading a digital image to be edited, said digital image:
   (i) having been stored in a lossy manner; and
   (ii) containing a reference to a proxy for itself, said proxy including:
      (A) a baseline image, and
      (B) meta data representing operations which, if performed on said baseline image, will reproduce said image to be edited absent said storage losses in (i);
(b) obtaining said referenced proxy;
(c) reproducing a version of said image to be edited, by operating on said baseline image using said meta data; and
(d) performing an additional operation on said lossless image as reproduced in (c), rather than on said lossy image as loaded in (a); thereby preventing said lossiness from said prior storage from accumulating into a subsequent lossy storage of said edited image.

22. A device for minimizing losses when performing successive editing of a digital image, comprising:
(a) an input interface for loading a digital image to be edited, said loaded image:
   (i) having been stored in a lossy manner; and
   (ii) containing a reference to a proxy for itself, said proxy including:
      (A) a baseline image, and
      (B) meta data representing operations which, if performed on said baseline image, will reproduce said image to be edited absent said storage losses in (i);
(b) means for obtaining said referenced proxy;
(c) means for reproducing a version of said image to be edited, by operating on said baseline image using said meta data; and
(d) means for performing an additional operation on said lossless image as reproduced in (c), rather than on said lossy image as loaded in (a);
thereby preventing said lossiness from said prior storage from accumulating into a subsequent lossy storage of said edited image.

23. A computer-readable medium comprising a proxy for, and usable to create, a lossless version of a digital image that would ordinarily be stored in lossy form, said proxy including:
(a) a baseline digital image; and
(b) a plurality of computer-executable instructions, said computer-executable instructions being
   (i) stored within a field of said baseline digital image, and
   (ii) executable in conjunction with an image editing program to operate on said baseline digital image, thereby reconstructing an edited version of said digital image, wherein said proxy is referenced in said edited version of said digital image.

24. A computer-readable medium containing computer-executable instructions for a process for recreating a lossless version of a digital image that would ordinarily be stored in lossy form, said process comprising:
(a) obtaining a digital image to be edited;
(b) editing said digital image by using a computer-implemented image manipulation program to perform a plurality of operations thereon;
(c) writing, to a computer-readable medium, a proxy for said edited digital image including:
  (i) a baseline version of said digital image obtained in (a), and
  (ii) meta data representing at least some of said performed operations,
    (A) said meta data being usable by a subsequent viewer to reconstruct said edited digital image from said baseline version of said digital image; and
(d) writing a reference to said proxy in said edited digital image.

25. A computer-readable medium comprising a proxy, said proxy including:
(a) a baseline digital image; and
(b) meta data, said meta data being
  (i) stored within a field of said baseline digital image, and
  (ii) executable in conjunction with an image editing program to operate on said baseline digital image, thereby reconstructing an edited version of said baseline digital image;
wherein said proxy is referenced in said edited version of said digital image.

26. The computer readable medium of claim 25 wherein said proxy is useable to create a substantially lossless version of a digital image that would be stored in lossy form.

27. A method of processing image data comprising:
(a) writing to a computer readable medium a proxy of an edited digital image that includes a reference to said proxy, said proxy including:
  (i) a baseline version of said edited digital image; and
  (ii) meta data representing at least some editing operations, said meta data being usable to reconstruct said edited digital image from said baseline version of said edited digital image.

28. The method of claim 27 further comprising, before said step (a), the steps of:
(b) obtaining a digital image to be edited; and
(c) editing said digital image by using a computer-implemented image manipulation program to perform a plurality of operations thereon to obtain said edited image.

29. The method of claim 27 further comprising writing an identifier of said proxy in a field of said edited digital image.

30. The method of claim 27 further comprising:
(d) loading said proxy for said edited digital image; and
(e) using at least some of said meta data in said proxy to obtain a reconstructed digital image from said baseline version of said digital image.

31. The method of claim 30 further comprising:
(f) receiving a user instruction to perform additional editing of said reconstructed digital image; and
(g) performing said additional editing on said reconstructed digital image.

32. A method for editing a digital image, comprising:
(a) writing an edited digital image to a computer-readable medium;
(b) generating a proxy of said edited digital image, said proxy including:
  (i) a baseline version of said edited digital image, and
  (ii) meta data representing at least some editing operations, said meta data being usable to reconstruct said edited digital image from said baseline version of said edited digital image; and
(c) including a reference to said proxy in said edited digital image.

* * * * *